United States Patent [19]

Suchy

[11] Patent Number: 4,457,078

[45] Date of Patent: Jul. 3, 1984

[54] LEVELING DEVICE FOR POWER TOOLS

[76] Inventor: Adalbert W. Suchy, 118 Saratoga Ave., Yonkers, N.Y. 10705

[21] Appl. No.: 328,946

[22] Filed: Dec. 9, 1981

[51] Int. Cl.³ .............................................. B23B 45/14

[52] U.S. Cl. .......................................... 33/334; 33/373; 408/16

[58] Field of Search ...................... 408/40, 16; 33/334, 33/371, 372, 373, 390, 384

[56] References Cited

U.S. PATENT DOCUMENTS

| | | | |
|---|---|---|---|
| 341,378 | 5/1886 | Gwyer | 33/334 |
| 1,234,594 | 7/1917 | Wilner . | |
| 2,452,930 | 11/1948 | Ivey | 33/214 |
| 2,525,387 | 10/1950 | Volk | 33/206 |
| 2,551,301 | 5/1951 | Terry, Jr. | 33/207 |
| 2,757,458 | 8/1956 | Zipser | 33/390 |
| 2,767,483 | 10/1956 | Sauer, Jr. | 33/207 |
| 2,806,296 | 9/1957 | Weichert | 33/207 |
| 3,052,036 | 9/1962 | Oliver | 33/207 |
| 3,664,032 | 5/1972 | Tompkins | 33/390 |
| 3,664,754 | 5/1972 | Kelbel | 408/16 |
| 3,807,051 | 4/1974 | Funakubo | 33/334 |
| 3,864,839 | 2/1975 | Wolf | 33/334 |
| 4,125,944 | 11/1978 | Esposito et al. | 33/347 |
| 4,141,151 | 2/1979 | Jansky | 33/334 |
| 4,154,001 | 5/1979 | Serafin | 33/373 |
| 4,295,279 | 10/1981 | Sienknecht | 33/334 |

*Primary Examiner*—Z. R. Bilinsky
*Assistant Examiner*—Thomas M. Kline
*Attorney, Agent, or Firm*—Eugene E. Geoffrey, Jr.

[57] ABSTRACT

A leveling attachment for a power tool having an inverted V-shaped block attached to the power tool by an adjustable flexible strap secured to the V-shaped block. The V-shaped block further includes a bifurcated member extending upwardly therefrom having an opening extending therethrough to receive a bolt to which the ends of the strap are affixed and a level having a bracket extending therefrom, the bracket being retained by said bifurcated member and having a central bolt receiving opening so that the level can be fixed in any selected position by tightening the bolt.

6 Claims, 6 Drawing Figures

Fig. 1.
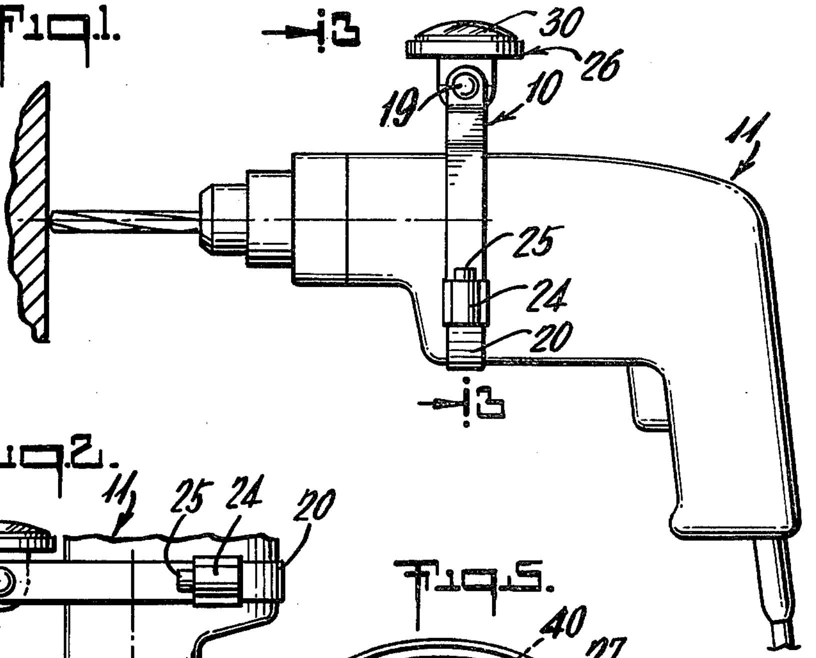
Fig. 2.
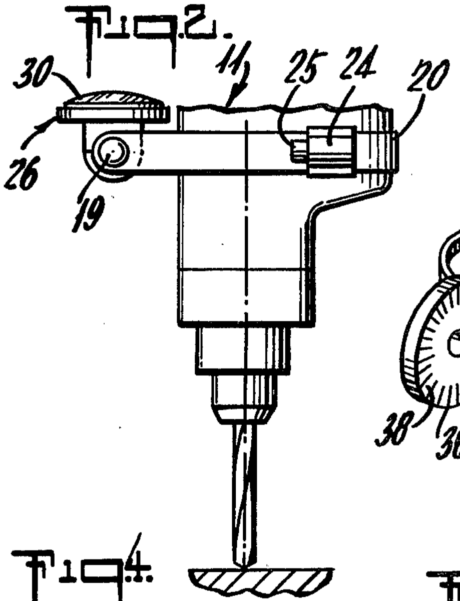
Fig. 5.
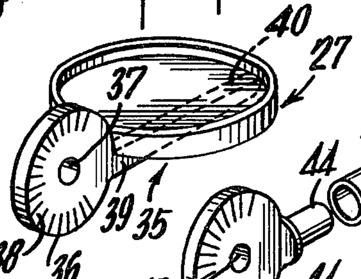
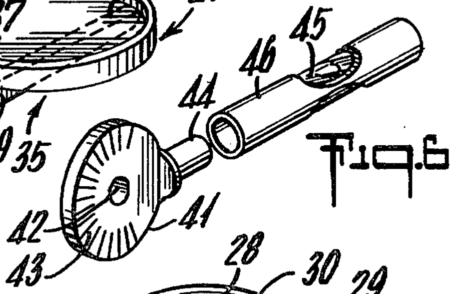
Fig. 6.
Fig. 4.
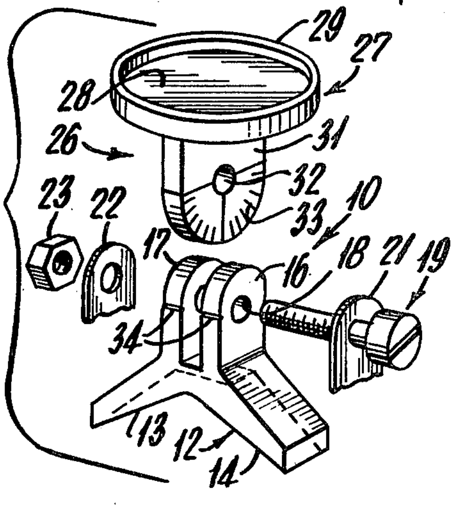
Fig. 3.
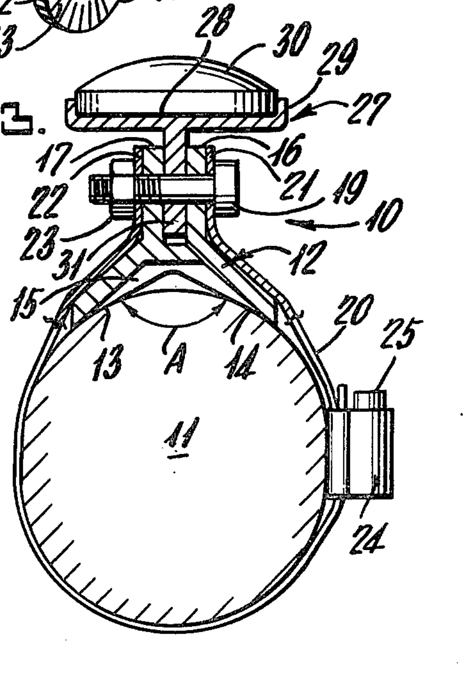

LEVELING DEVICE FOR POWER TOOLS

This invention relates to leveling devices and more specifically to a novel and improved level for use with power tools such as electric drills and the like.

Devices have been proposed for leveling power tools and specifically power drills, but known structures have not been found satisfactory for numerous reasons including the relative high cost of manufacture and the difficulty entailed in affixing the level to the power tool and adjusting the level when in position on the power tool. In many known structures, the level is either permanently installed on the tool or in the alternative the tool is provided with mounting means for a specific level structure. In other cases, the level mounting means is designed for use with a power tool having a body of a specific diameter and would not be generally adaptable for use with power tools of a wide variety of sizes and shapes.

One object of the invention resides in the provision of a novel and improved leveling device for power tools which overcomes the difficulties entailed with known devices and which can be secured readily to power tools of a wide variety of shapes and sizes.

Another object of the invention resides in the provision of a novel and improved leveling device for power tools which is characterized by its simplicity, relatively low cost and ease of installation and adjustment.

The invention includes an inverted V-shaped mounting block having a bifurcated member extending therefrom. The legs of the bifurcated member include a transverse opening to receive a bolt for attaching the ends of a flexible and adjustable band to the bifurcated member and for retaining level supporting means between the legs of the member. The level supporting means includes a calibrated disc-like member having level attaching means extending therefrom to receive and retain a suitable level and provide for angular adjustment of the level.

The above and other objects and advantages of the invention will become more apparent from the following description and accompanying drawings forming part of this application.

In the drawings:

FIG. 1 is a side elevational view of one embodiment of the invention affixed to an electric drill in a horizontal position;

FIG. 2 is a fragmentary side elevational view of the drill shown in FIG. 1 in a vertical position;

FIG. 3 is a cross sectional view of FIG. 1 taken along the line 3—3 thereof;

FIG. 4 is an exploded perspective view of a fragmentary portion of the leveling device shown in FIGS. 1 to 3;

FIG. 5 is a perspective view of a modified form of the adjustable level in accordance with the invention; and FIG. 6 is a perspective view of still another form of the adjustable level in accordance with the invention.

The leveling device in accordance with the invention is adapted to be removably secured to a power tool such as an electric drill and the like and is arranged to provide a stable mount for a level on power tools notwithstanding the size or configuration of the body portions thereof. The level can also be readily adjusted relative to the tool so that in the case of a power drill for instance, the drill can be readily maintained at a selected angle.

More specifically and with reference to FIGS. 1 through 4, the leveling device in accordance with the invention is generally denoted by the numeral 10 and for illustrative purposes is affixed to an electric drill 11. The leveling device 10 includes an inverted V-shaped bracket generally denoted by the numeral 12 and shown more clearly in FIGS. 3 and 4. The bottom faces 13 and 14 of the V-shaped bracket 12 may be disposed in any desired angle one relative to the other in order to accomodate a wide variety of curvatures on the body of the power tool 11. In the illustrated embodiment of the invention, this angle, denoted by the letter A, is in the range of 140° to 150° though it is apparent that a wide variety of angles may be employed. The central portions of the surfaces 13 and 14 are also recessed as denoted by the numeral 15 so that the bracket 12 when positioned on the body of the power tool 11 will have essentially four contact points.

A bifurcated structure comprising legs 16 and 17 extends upwardly from the bracket 12 and a hole 18 extends through both legs 16 and 17 to accomodate a bolt 19. A flexible strap 20 is connected to the V-shaped bracket 12 through engagement of the end portions 21 and 22 with the bolt 19 as illustrated more clearly in FIG. 3. A nut 23 engages the bolt 19 to retain the strap 20 in engagement therewith. The strap 20 may be in the form of a hose clamp having a length adjusting device 24 operated by a slotted head 25. The device 24 has an elongated worm which may engage openings in the strap 20 or raised portions on the strap so that rotation of the slotted head 25 will rotate the worm and tighten the strap firmly about the body of the power tool 11.

The level, as illustrated in FIGS. 1 through 4, is in the form of a spherical level generally denoted by the numeral 26. In one form, the level includes a circular structure 27 having a bottom wall 28 and an annular rim 29. A prefabricated spherical level 30 is then secured within the circular element 27. A projecting element in the form of a tab or bracket 31 is secured to the underside of the circular member 27 and extends downwardly therefrom. The bottom portion of the bracket 31 has a semi-circular configuration and a central opening 32 extending therethrough. The tab 31 is positioned between the legs 16 and 17 of the V-shaped bracket 12 with the bolt 19 extending through the opening 32. With this arrangement and upon tightening the nut on the bolt 19, the level 26 can be held in any desired position. To facilitate adjustment of the level relative to the power tool 11, the tab 31 preferably includes angular indicating marks 33 and the legs 16 and 17 include markers 34 coordinated with the marks 33 so that a precise adjustment of the level can be effected. If desired, the level 30 may be formed integrally with the circular member 27 by merely fitting a circular convex element to the circular structure 27 and then filling the space defined by the convex element and the base 28 of the structure 27 with a suitable liquid.

A modified form of the invention is illustrated in FIG. 5. In this form of the invention, the leveling means generally denoted by the numeral 35 includes a disc-shaped member 36 having a central opening 37 and an angular scale 38. An arm 39 extends from and in the plane of the disc 36 and the upper surface 40 of the arm 39 is in a plane aligned with the center of the opening 37. A disc-shaped member 27, which is similar to the disc-shaped member 27 of FIG. 4, may either be formed integrally with the arm 39 or in the alternative secured to the arm 39 in any suitable manner. The leveling means, such as the level 30 of FIGS. 1 and 3, is then either inserted into the disc-shaped member 27 or in the level is formed as part of the member 27 as previously described. With this arrangement, the disc-shaped member 36 is inserted between the legs 16 and 17 of the V-shaped member 12 and secured in place by the bolt 19 as previously described in connection with the embodiment of the invention as shown in FIGS. 1 through 4.

Another modified form of the invention is illustrated in FIG. 6. In this form of the invention, the disc-shaped member 41, which corresponds to the disc-shaped member 36 of FIG. 5, is also provided with a central opening 42 and an angular scale 43. A short cylindrical element 44 is secured to and extends from an edge of the disc 41 to receive and support a straight level 45 mounted within a tubular member 46. The tubular member 46 is then secured in a suitable manner to the post 44. While the post 44 and tube 46 are both cylindrical, it is obvious that the post 44 could have any desired configuration and that the opening within the tube 46 would have a suitable corresponding configuration to enable it to be fastened securely to the post 44.

While only certain embodiments of the invention have been illustrated and described, it is apparent that alterations, changes and modifications may be made without departing from the true scope and spirit thereof.

What is claimed is:

1. A leveling attachment for power tools having a body and a material cutting tool projecting from the body comprising a unitary member of relatively rigid material having an inverted V-shaped portion with two downwardly and outwardly extending legs having inclined surfaces on the underside thereof and a bifurcated support extending upwardly from said V-shaped portion, said support having a pair of spaced parallel legs aligned with the legs of said V-shaped portion and aligned openings extending through said legs, a bolt extending through said openings and having a cooperating nut, a flexible strap having perforated end portions with one end portion engaging one end of said bolt and lying against the outer surface of one of said legs of said bifurcated support and the adjoining leg of said V-shaped portion and the other end engaging the other end of said bolt and lying against the outer surface of the other of said legs of said bifurcated support and the adjoining leg of said V-shaped portion, means on said strap for adjusting the length thereof, said strap being adapted to encircle the body of said power tool with said inclined surfaces engaging said body and said adjusting means functioning to secure said strap and said unitary member to said body, and adjustable leveling means including a support extending therefrom, said support having an opening therein and positioned between the legs of said bifurcated support and in engagement with said bolt whereby said level is angularly movable relative to said power tool to facilitate positioning of the material cutting tool at desired angles relative to said material being cut.

2. A leveling attachment according to claim 1 wherein the inclined surfaces of said V-shaped recess have centrally disposed recesses extending throughout the lengths thereof and forming four discrete points of contact with the body of said power tool.

3. A leveling attachment according to claim 1 wherein said leveling means comprises a circular plate and a level carried by said plate, said leveling means support being attached to and disposed normally of said plate.

4. A leveling attachment according to claim 1 wherein said leveling means comprises a circular plate and a level carried by said plate and said leveling means support includes a disc having a central opening engaging said bolt, and a projecting element extending from the edge of said disc and aligned with the plane thereof, said circular plate being carried by said projecting element.

5. A leveling attachment according to claim 4 wherein said level is a spherical level.

6. A leveling attachment according to claim 1 wherein said leveling means comprises a disc having a central opening engaging said bolt, a projecting element extending from the edge of said disc and aligned with the plane thereof and a linear level engaging said projecting element.

* * * * *